US012610183B2

(12) United States Patent
Starrs et al.

(10) Patent No.: US 12,610,183 B2
(45) Date of Patent: Apr. 21, 2026

(54) OUTDOOR SPEAKER SYSTEM

(71) Applicant: Tungsten Audio LLC, Brighton, MI (US)

(72) Inventors: Clint Starrs, Brighton, MI (US); Nathan Vohwinkle, Howell, MI (US); Dale Goodman, Wells, ME (US); Craig Verrill, Westbrook, ME (US)

(73) Assignee: Tungsten Audio LLC, Brighton, MI (US)

( * ) Notice: Subject to any disclaimer, the term of this patent is extended or adjusted under 35 U.S.C. 154(b) by 149 days.

(21) Appl. No.: 18/580,151

(22) PCT Filed: Jul. 21, 2022

(86) PCT No.: PCT/US2022/037822
§ 371 (c)(1),
(2) Date: Jan. 17, 2024

(87) PCT Pub. No.: WO2023/004008
PCT Pub. Date: Jan. 26, 2023

(65) Prior Publication Data
US 2024/0340578 A1 Oct. 10, 2024

Related U.S. Application Data

(60) Provisional application No. 63/224,043, filed on Jul. 21, 2021.

(51) Int. Cl.
*H04R 1/02* (2006.01)
*G06F 3/16* (2006.01)
(Continued)

(52) U.S. Cl.
CPC .............. *H04R 3/00* (2013.01); *G06F 3/165* (2013.01); *H02S 20/20* (2014.12); *H02S 40/38* (2014.12);
(Continued)

(58) Field of Classification Search
CPC .......... H04R 3/00; H04R 1/025; H04R 1/026; H04R 2420/07
See application file for complete search history.

(56) References Cited

U.S. PATENT DOCUMENTS

| | | | |
|---|---|---|---|
| 6,710,648 B2 | 3/2004 | Liang et al. | |
| D503,703 S | 4/2005 | Beckett et al. | |

(Continued)

FOREIGN PATENT DOCUMENTS

| | | |
|---|---|---|
| CN | 3471855 | 8/2005 |
| CN | 300997651 | 9/2009 |

(Continued)

OTHER PUBLICATIONS amazon.com, "Samson Technologies Expedition XP106w Rechargeable Portable PA System with Wireless Handheld Microphone and Bluetooth, Black", https://www.amazon.com/Samson-Expedition-Rechargeable-Microphone-Bluetooth/dp/B00HXE4AWK/ref=sr_1_1?keywords=samson+technologies+expedition+xp106w&qid=1664991558&qu=eyJxc2MiOilwLjAwiiwicXNhljolMC4wMCIsInFzzcCl6ljAuMDAifQ%sD%sD&sprefix=samson+technologies+expedition+xp1%2Caps%2C110&sr=8-1;p. 1, figure 1, Jun. 9, 2014, 12 pages.

(Continued)

*Primary Examiner* — Disler Paul
(74) *Attorney, Agent, or Firm* — Howard & Howard Attorneys PLLC

(57) ABSTRACT

An outdoor speaker system including a housing configured to accommodate a speaker unit, a top panel, a bottom panel, a front panel, and at least one side panel. The housing is encased by the top, bottom, front, and at least one side panel. The outdoor speaker system further includes a computing device and a plurality of solar panels that provide power to the outdoor speaker system and/or any external device. The computing device includes control buttons to control and (Continued)

interface with the speaker unit. The plurality of solar panels includes a top solar panel configured to couple to the top panel and a continuous solar panel configured to couple to at least two sides of the housing. The continuous solar panel receives solar energy from the sun regardless of what direction the outdoor speaker system is facing such that the outdoor speaker system is provided with sufficient power.

18 Claims, 11 Drawing Sheets

(51) Int. Cl.

| | | |
|---|---|---|
| *H02S 20/20* | (2014.01) | |
| *H02S 40/38* | (2014.01) | |
| *H04R 3/00* | (2006.01) | |
| *H02J 7/35* | (2006.01) | |

(52) U.S. Cl.
CPC ............ *H04R 1/025* (2013.01); *H04R 1/026* (2013.01); *H02J 7/35* (2013.01); *H04R 2420/07* (2013.01); *H04R 2430/01* (2013.01)

(56) References Cited

U.S. PATENT DOCUMENTS

| | | | | |
|---|---|---|---|---|
| 7,286,675 | B1 * | 10/2007 | O'Neill ................ H04R 25/502 381/102 |
| D565,549 | S | 4/2008 | Sawhney et al. |
| D586,783 | S | 2/2009 | Lui et al. |
| D644,351 | S | 8/2011 | Hasse |
| 8,013,719 | B2 | 9/2011 | Haase |
| 8,345,889 | B2 | 1/2013 | Li |
| D739,381 | S | 9/2015 | Workman et al. |
| 9,232,290 | B2 | 1/2016 | Besay |
| 9,264,791 | B1 | 2/2016 | Polivy |
| D754,102 | S | 4/2016 | Sun |
| 9,536,514 | B2 * | 1/2017 | Lewis ...................... H04K 3/42 |
| 9,883,265 | B2 | 1/2018 | Cheney et al. |
| D810,721 | S | 2/2018 | Soofer |
| D829,191 | S | 9/2018 | Yang et al. |
| 10,091,568 | B2 | 10/2018 | Hammary |
| 10,116,139 | B2 | 10/2018 | Williams |
| 10,136,201 | B2 * | 11/2018 | Fisher ...................... H04R 1/02 |
| 10,206,475 | B2 * | 2/2019 | Pusey .................... A45C 15/02 |
| D843,972 | S | 3/2019 | Wu |
| 10,231,039 | B2 | 3/2019 | Soofer |
| 10,638,209 | B2 * | 4/2020 | Cheney .................. H02J 50/10 |
| D897,310 | S | 9/2020 | Wu |
| D899,404 | S | 10/2020 | Adrian |
| D938,933 | S | 12/2021 | Aldini et al. |
| D947,815 | S | 4/2022 | Cabitza |
| D958,111 | S | 7/2022 | Meredith et al. |
| 11,482,879 | B2 * | 10/2022 | Salzinger ............. H02J 7/0013 |
| D991,909 | S | 7/2023 | Jia et al. |
| 11,862,763 | B2 * | 1/2024 | Thiel ...................... H02S 40/42 |

| | | | |
|---|---|---|---|
| 2006/0126860 | A1 | 6/2006 | Sievers et al. |
| 2008/0157711 | A1 | 7/2008 | Chiang et al. |
| 2010/0166230 | A1 | 7/2010 | Tseng et al. |
| 2010/0260349 | A1 | 10/2010 | Chen |
| 2011/0110537 | A1 | 5/2011 | Chang |
| 2012/0025750 | A1 | 2/2012 | Margo |
| 2012/0295671 | A1 | 11/2012 | Alves et al. |
| 2012/0300962 | A1 | 11/2012 | Devoto |
| 2017/0104441 | A1 * | 4/2017 | Swan ...................... H02S 30/20 |
| 2020/0088360 | A1 | 3/2020 | Salzinger et al. |
| 2020/0351579 | A1 | 11/2020 | Pavelic |
| 2021/0239284 | A1 * | 8/2021 | Jeong ...................... F21S 9/032 |

FOREIGN PATENT DOCUMENTS

| | | |
|---|---|---|
| CN | 301077496 | 12/2009 |
| CN | 301720574 S | 11/2011 |
| CN | 102811402 A | 12/2012 |
| CN | 302216085 S | 12/2012 |
| CN | 302838784 S | 6/2014 |
| CN | 303084092 S | 1/2015 |
| CN | 205179325 U | 4/2016 |
| CN | 205283784 U | 6/2016 |
| CN | 205332058 U | 6/2016 |
| CN | 205356650 U | 6/2016 |
| CN | 205946111 U | 2/2017 |
| CN | 206226647 U | 6/2017 |
| CN | 107318066 A | 11/2017 |
| CN | 206698381 U | 12/2017 |
| CN | 304420631 S | 12/2017 |
| CN | 304593279 S | 4/2018 |
| CN | 207820203 U | 9/2018 |
| CN | 304848300 S | 10/2018 |
| CN | 304939831 S | 12/2018 |
| CN | 109361999 A | 2/2019 |
| CN | 208509186 U | 2/2019 |
| CN | 305222102 S | 6/2019 |
| CN | 305250078 S | 7/2019 |
| CN | 305419389 S | 11/2019 |
| CN | 305678870 S | 4/2020 |
| CN | 305678871 S | 4/2020 |
| CN | 210781198 U | 6/2020 |
| CN | 305896023 S | 7/2020 |
| CN | 212034286 U | 11/2020 |
| EP | 3291312 A1 | 3/2018 |
| IE | 20050567 A1 | 9/2007 |
| KR | 20160148888 A | 12/2016 |
| WO | 07003074 A1 | 1/2007 |
| WO | 08049211 A1 | 5/2008 |
| WO | 08135619 A1 | 11/2008 |
| WO | 10061346 A1 | 6/2010 |
| WO | 12034307 A1 | 3/2012 |

OTHER PUBLICATIONS

International Search Report for Application No. PCT/US2022/037822 dated Oct. 17, 2022, 1 page.

* cited by examiner

OUTDOOR SPEAKER SYSTEM

CROSS-REFERENCE TO RELATED APPLICATIONS

The present application is a National Stage of International Patent Application No. PCT/US2022/037822, filed on Jul. 21, 2022, which claims priority to and all the benefits of U.S. Provisional Patent Application No. 63/224,043, filed on Jul. 21, 2021, the entire contents of which are hereby expressly incorporated herein by reference.

FIELD OF THE INVENTION

The subject disclosure relates, generally, to speakers and systems and, more specifically, to an outdoor speaker including solar panels.

BRIEF DESCRIPTION OF THE DRAWINGS

Referring now to the drawings, exemplary illustrations are shown in detail. Although the drawings represent schematic configurations, the drawings are not necessarily to scale and certain features may be exaggerated to better illustrate and explain an innovative aspect of an illustrative configuration. Further, the exemplary illustrations described herein are not intended to be exhaustive or otherwise limiting or restricting to the precise form and configuration shown in the drawings and disclosed in the following detailed description. Advantages of the present invention will be readily appreciated as the same becomes better understood by reference to the following detailed description when considered in connection with the accompanying drawings.

DETAILED DESCRIPTION

Figure 1:
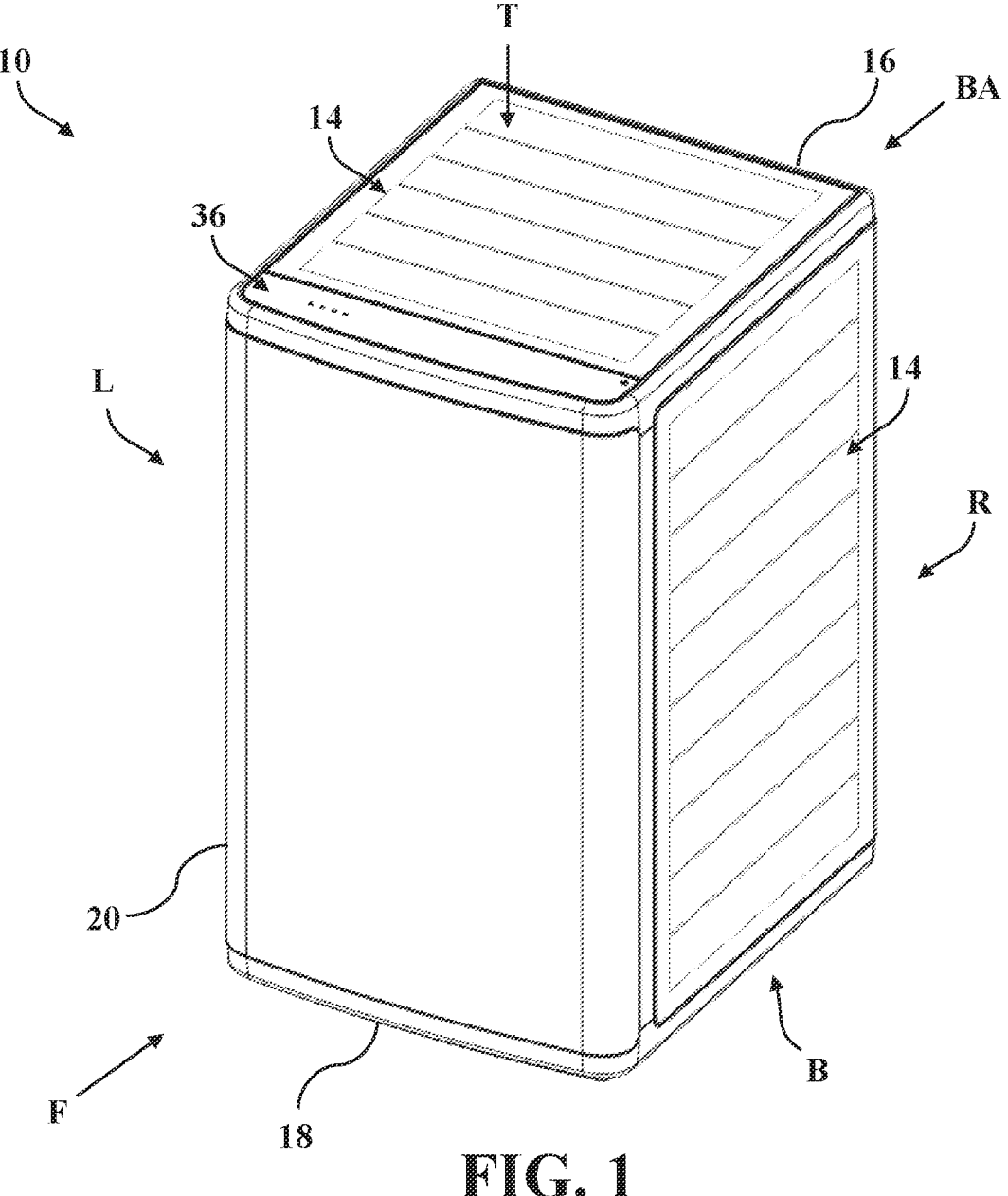
FIG. 1 is a right-side top perspective view of an outdoor speaker system including a plurality of solar panels, according to one configuration.

Referring now to the drawings, where like numerals indicate like or corresponding parts throughout the several views, an outdoor speaker system is generally shown at 10 in FIG. 1. The outdoor speaker system 10 includes a housing 12 that is configured to mechanically and/or electrically connect to a plurality of solar panels 14 that provide power to the outdoor speaker system 10. The configurations disclosed herein are described in the context of speakers used in the outdoor environments. However, those having ordinary skill in the art will appreciate that the outdoor speaker system 10 could be used indoors. Additionally, it is contemplated that the outdoor speaker system 10 disclosed herein may be applied to more than stand-alone speakers.

Figure 2:
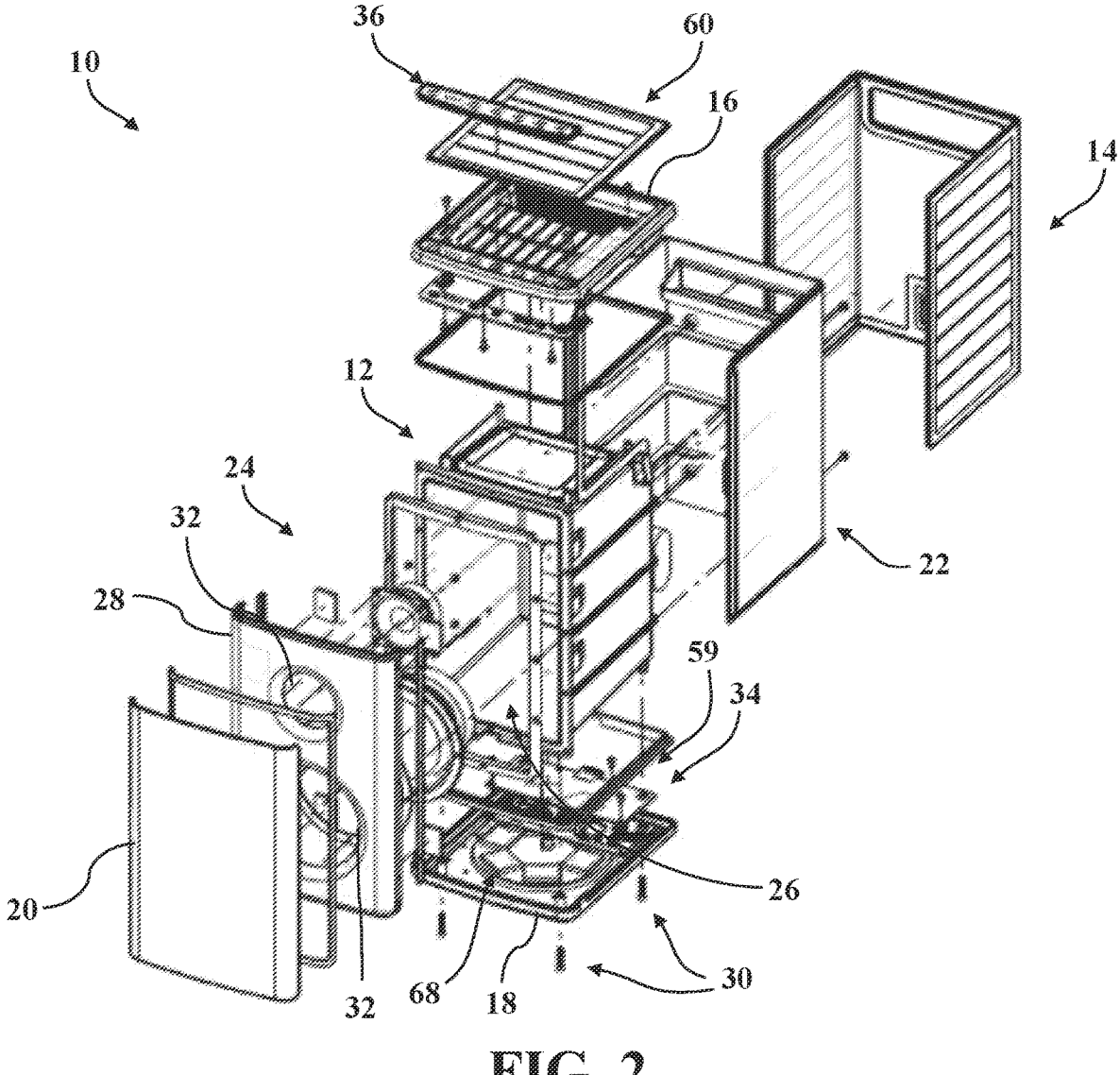
FIG. 2 is an exploded perspective view of the outdoor speaker system of FIG. 1.
Figure 3:
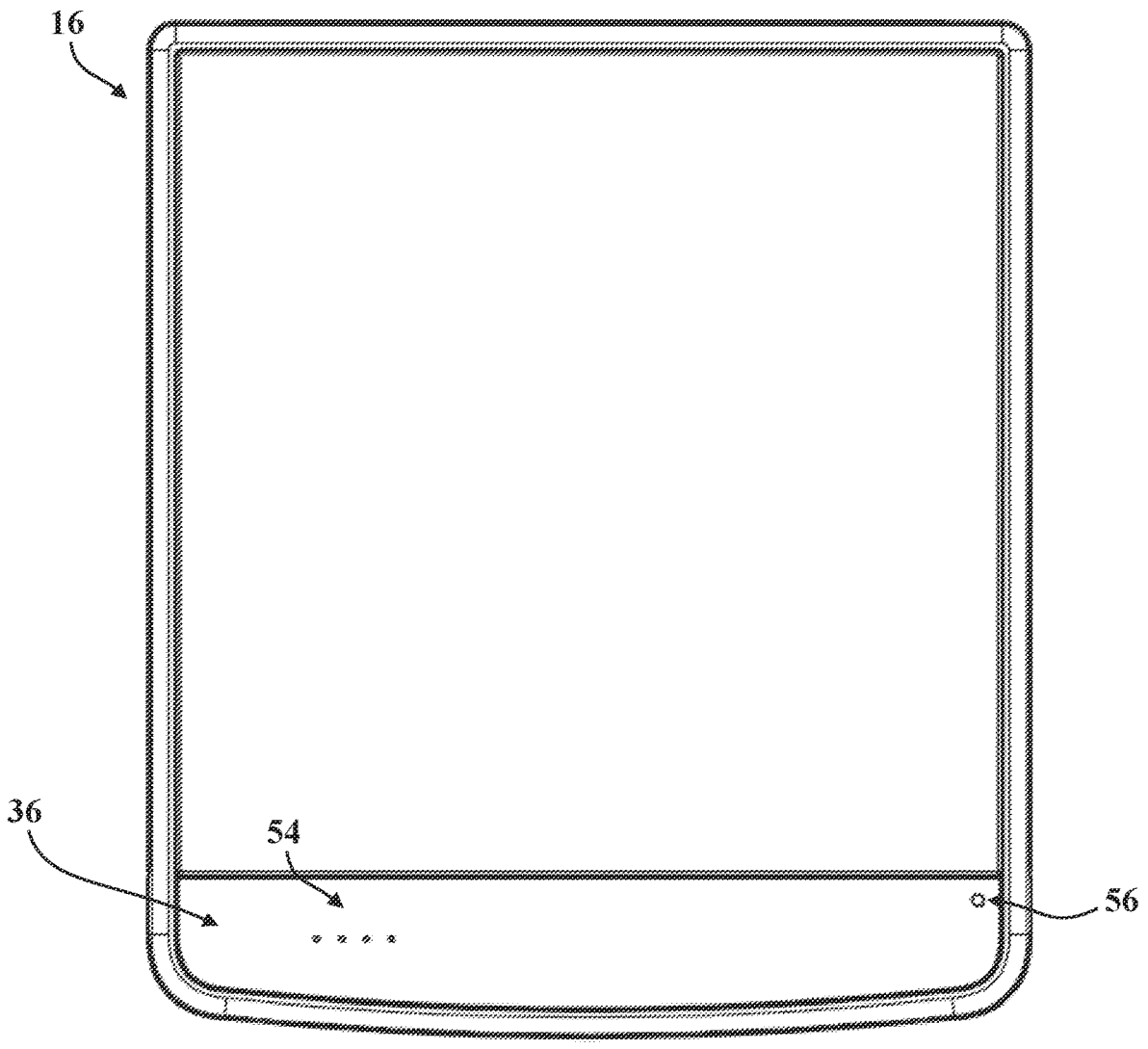
FIG. 3 is a top plan view of the outdoor speaker system including a user interface, according to one exemplary configuration.

Referring now to FIGS. 2 and 3, components of the outdoor speaker system 10 are shown in greater detail. In the illustrated configuration, the outdoor speaker system 10 includes a housing 12 having a top side T, a bottom side B, a back side BA, a right side R, and a left side L. The housing 12 is encased by a top panel 16, a bottom panel 18, a front panel 20, and at least one side panel 22. In the configuration shown, the housing 12 is encased by one side panel 22 on the left side L, right side R, and back side BA of the housing 12. In other configurations, the housing 12 may be encased by three side panels, one on the left side L, right side R, and back side BA, respectively. It is contemplated that the side panel 22 may be one unitary component encasing multiple sides of the housing 12, separate components encasing a side of the housing 12, and/or any combinations thereof. The top panel 16 is configured to be positioned on the top side T of the housing 12, the bottom panel 18 is configured to be positioned on the bottom side B of the housing 12, and the side panel(s) 22 are configured to be positioned on the sides of the housing 12. The top, bottom, and side panels 16, 18, and 22 are configured to couple to each other to enclose the housing 12. The housing 12 is configured to encase a speaker unit 24 in an interior volume 26 defined within the housing 12. The front side of the housing 12 includes a speaker panel 28 behind which the speaker unit, generally indicated at 24, may be placed. It is contemplated that the top, bottom, front, and side panels 16, 18, 20, and 22 may be removably secured to the housing 12 with one or more fasteners, generally indicated at 30. More specifically, the top panel 16 may be configured to couple to the top side T of the housing 12 via fasteners 30. In a similar fashion, the bottom panel 18 may be configured to couple to the bottom side B of the housing 12 via fasteners 30. Here, it will be appreciated that one or more seals, gaskets, frames, and the like may be provided between the housing 12 and top, bottom, front, and/or side panels 16, 18, 20, or 22 to further provide an internal support structure for the outdoor speaker system 10. Additionally, the top, bottom, front, and/or side panels 16, 18, 20, and/or 22 may further seal electrical contacts thereunder from water and debris. Moreover, it will be appreciated that the housing 12 could accommodate or otherwise support any other component of the outdoor speaker system 10.

It is contemplated that the housing 12 may take a variety of different forms and/or shapes and is not limited to the shape as shown in the Figures. It is also contemplated that the housing 12 can be made from a variety of materials or combinations of materials. For example, plastics, foams, rubbers, silicones, vinyl, leather, metals, or any combinations thereof may be used. It is further contemplated that the housing 12 may include or otherwise be coated with waterproof material to prevent any internal components from getting wet and withstand different environments. In some configurations, the housing 12 may also be configured to be resistant to water or prevent liquid penetration such that the outdoor speaker system 10 may be waterproof or water resistant. It is contemplated that any component of the outdoor speaker system 10 may be coated with waterproof material, be water resistant, and/or prevent liquid penetration.

As shown in FIG. 2, the housing 12 is configured to encase the speaker unit 24 in the interior volume 26 defined within the housing 12 to provide better sound quality performance as well as be protected from different environments. As mentioned above, the front side of the housing 12 includes the speaker panel 28 behind which the speaker unit 24 may be placed. The speaker panel 28 defines at least one opening 32 that is adapted to receive outward facing speakers. In the configuration shown, the speaker panel 28 defines two openings 32A, 32B. It is contemplated that the speaker panel 28 may define any number of openings 32. In the configuration shown, the speaker unit 24 is configured to face outwards towards the front side of the housing 12. It is contemplated that the speaker unit 24 may be configured to face outwards towards any side of the housing 12. For example, the speaker unit 24 may be configured to face outwards towards the back side of the housing 12. It is further contemplated that the speaker unit 24 may include any number of speakers.

The front panel 20 is configured to couple to the speaker panel 28 on the front side of the housing 12. In this way, the front panel 20 also provides an aesthetic appeal while protecting the electrical components encased in the housing 12 from water and debris. In some configurations, the front panel 20 is removable when not in use. The front panel 20 may be configured to be mechanically attached to the speaker panel 28 using any type of mechanical coupling known in the art.

The outdoor speaker system 10 further includes a controller 34. The controller 34 and associated processors for using user interfaces are described. The outdoor speaker system 10 includes any number of controllers 34 and the controller 34 may be configured to communicate with and to any internal and/or external controller. For instance, the outdoor speaker system is connectable to external devices. In some configurations, the controller 34 may be configured to cooperate with a portable communication device or an external device, such as a mobile phone, that also contains other functions, such as music player functions. While in other configurations, the controller 34 may be configured to communicate to any internal controller to control any type of speaker functions. It will be appreciated that the controller 34 is configured to communicate wirelessly or via a wired connection. The controller 34 will be discussed in greater detail below.

Various applications and/or functions may be executed on the controller 34 via at least one user interface device 36. For example, in some configurations, the user interface device 36 includes a display 38 and/or a touch-sensitive surface 39 to control and interface with the speaker unit 24. One or more functions of the touch-sensitive surface 39 as well as corresponding information shown on the display 38 may be adjusted and/or varied from one function to the next. In this way, a common physical architecture (such as the touch-sensitive surface 39) of the device may support the variety of functions and applications with user interfaces that are intuitive. The user interface device 36 provides easy access and control to users. It will be appreciated that the user interface device 36 may also be referred to any other connotation that indicates that the user interface device 36 will aid in controlling at least some operation of the outdoor speaker system 10. The user interface device 36 may also be referred to as a user display, interactive display, or relative terms. The user interface device 36 may also be configured to couple to an external device such as a mobile phone, a tablet, or generally any other handheld or portable device.

Figure 4:
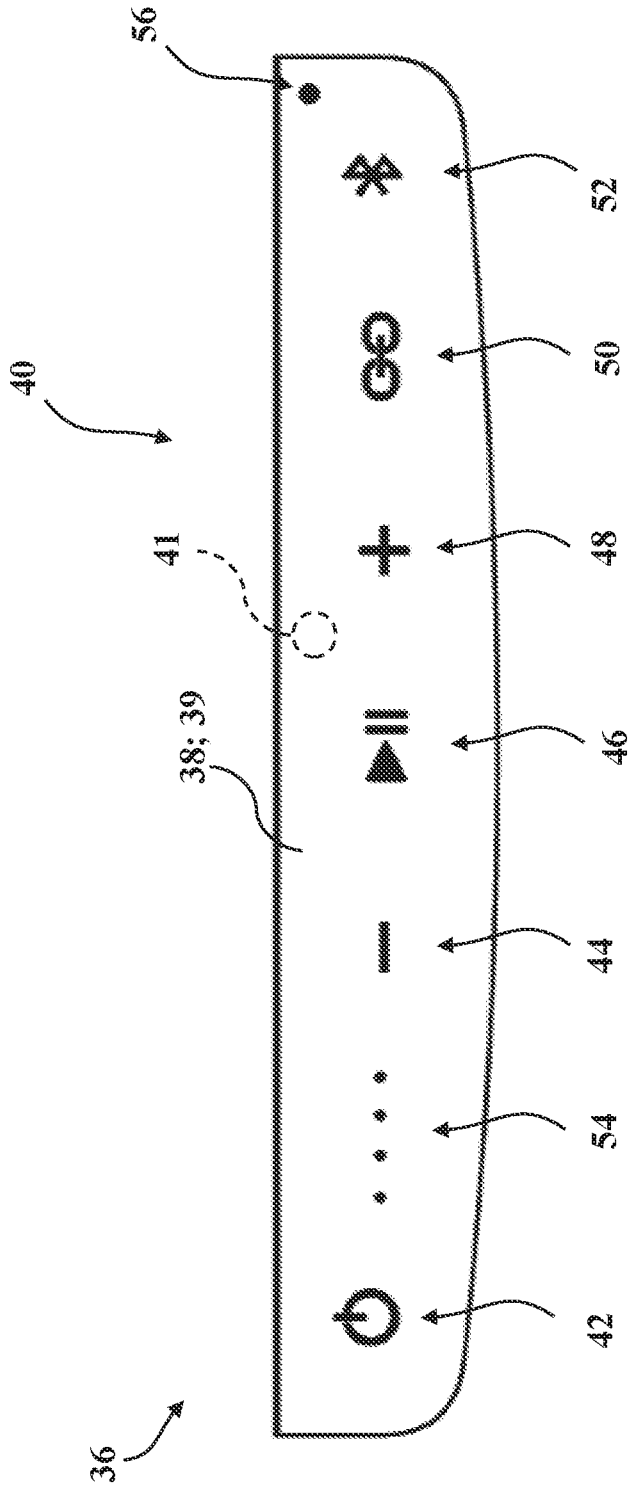
FIG. 4 illustrates the user interface of the outdoor speaker system from a top plan view, according to another exemplary configuration.

In some configurations, the touch-sensitive surface 39 may include a sensor, shown generally in FIG. 4 and in phantom at 41, which is programmable to more than one particular function. For example, the sensor 41 may function as a fingerprint reader, a programmable button, a touchscreen displaying visual output, etc. In addition, the sensor 41 may be programmed to function in response to application commands, outdoor speaker system 10 controls, user authentication, or in response to any input from a user.

The outdoor speaker system 10 and/or the user interface device 36 includes control buttons 40 to control and interface with the speaker unit 24. The control buttons 40 may be physical push buttons or touch-sensitive control buttons 40. In configurations with touch-sensitive control buttons 40, the sensor 41 may be provided. The outdoor speaker system 10 may include any number of control buttons 40, including, but not limited to, power, volume, play, pair, and the like. It will be appreciated that the control buttons 40 may be any other programmable function.

Referring back to FIG. 2, the outdoor speaker system 10 includes a plurality of magnets 68 or other mounting features. In the configurations shown, the plurality of magnets 68 are coupled to the bottom panel 18. In this way, the plurality of magnets 68 are provided on the bottom of the outdoor speaker system 10 such that the bottom of the outdoor speaker system 10 is securable to any component or surface via a magnetic attraction. While the magnetic attraction between the plurality of magnets 68 and the component or surface is sufficiently strong to secure the outdoor speaker system 10, it should be noted that the magnetic attraction is sufficiently weak such that the outdoor speaker system 10 is removable relative to the component or surface. Additional functionality provided by the plurality of magnets 68 are contemplated. It will be appreciated that the outdoor speaker system 10 may include any number of magnets. For instance, in the configurations shown, the plurality of magnets 68 is further defined as six magnets arranged in a circular manner and coupled to the bottom panel 18. Other configurations are contemplated.

Referring to FIG. 4, an exemplary configuration of the user interface device 36 with control buttons 40 is illustrated. Multiple control buttons 40 including a power button 42, a volume down button 44, a play/pause button 46, a volume up button 48, a pairing button 50, and a Bluetooth button 52 are provided. It is contemplated that the user interface device 36 may include any number and combination of control buttons 40. Further, any of the control buttons 40 may be a dual functioning control button. For example, the play/pause button 46 may be a dual functioning control button for initiating the playing of audio as well as pausing of audio. In another example, a play button 46 and the pairing button 50 may be a dual functioning control button for initiating the playing of audio and activating a pairing mode to a wireless device. Although the control buttons 40 for the play and pause functions are shown as a dual functioning control button, it is contemplated that any of the control buttons 40 may be a single functioning control button. For example, the user interface device 36 may include separate control buttons 40 for a play button and a pause button.

Although the control buttons 40 are shown on the user interface device 36, it is contemplated that the control buttons 40 may be positioned anywhere on the outdoor speaker system 10. For example, additional control buttons 40 may be positioned on a side panel on the back side of the outdoor speaker system 10.

As shown in FIG. 4, the outdoor speaker system 10 and/or the user interface device 36 further includes a plurality of light elements 54. The light elements 54 may be light-emitting diodes (LED), fluorescent, halogen or a variety of other light elements 54 that are interchangeable. The light elements 54 may also be filtered to provide lighting of different colors and may also be dimmable. The light elements 54 can vary intensity and color based on user preference and/or function, operation, and/or status of the outdoor speaker system 10. For example, the light elements 54 may provide visible means by which a user can determine an operation status of the system. More examples are provided below. The light from the light elements 54 may be configured to be solid and/or blink in response to various function, operation, and/or status. It is contemplated that the light elements 54 may function independent of the audio or sound from the speaker unit 24. The plurality of lights elements may be provided without compromising the quality of sound that is produced.

In the configuration shown, the outdoor speaker system 10 includes a first light element 54 and a second light element 56. It will be appreciated that the first and second light elements 54, 56 may include any number of light elements. In the configurations shown, the first light element 54 includes four light elements and the second light element 56 includes one light element. The first light element 54 may indicate any function, operation, and/or status of the outdoor speaker system 10. For example, the first light element 54 may be a battery indicator such that when the first light element 54 emits one of the emitting light element, it indicates a status of low battery and when the first light element 54 emits all four of the emitting light elements, it indicates a status of good or full battery. In another example, the first light element 54 may be a volume indicator such that when the first light element 54 emits one of the emitting light element, it indicates a low volume, and when the first light element 54 emits all four of the emitting light elements, it indicates the highest volume of the outdoor speaker system 10.

Additionally, the second light element 56 may indicate any function, operation, and/or status of the outdoor speaker system 10. For example, the second light element 56 may be configured to indicate a pairing status such that when a device is paired to the outdoor speaker system 10. It is contemplated that the outdoor speaker system 10 may be configured to pair and/or receive inputs from a plurality of devices. The second light element 56 may blink during the pairing process and become solid once the pairing is successful. In another example, the second light element 56 may be a power indicator such that when the outdoor speaker is on, the second light element 56 emits a light and vice versa. It is contemplated that the first and second light elements 52A, 52B may be configured to indicate any function, operation, and/or status of the outdoor speaker system 10 and/or any component of the outdoor speaker system 10.

Figure 5:
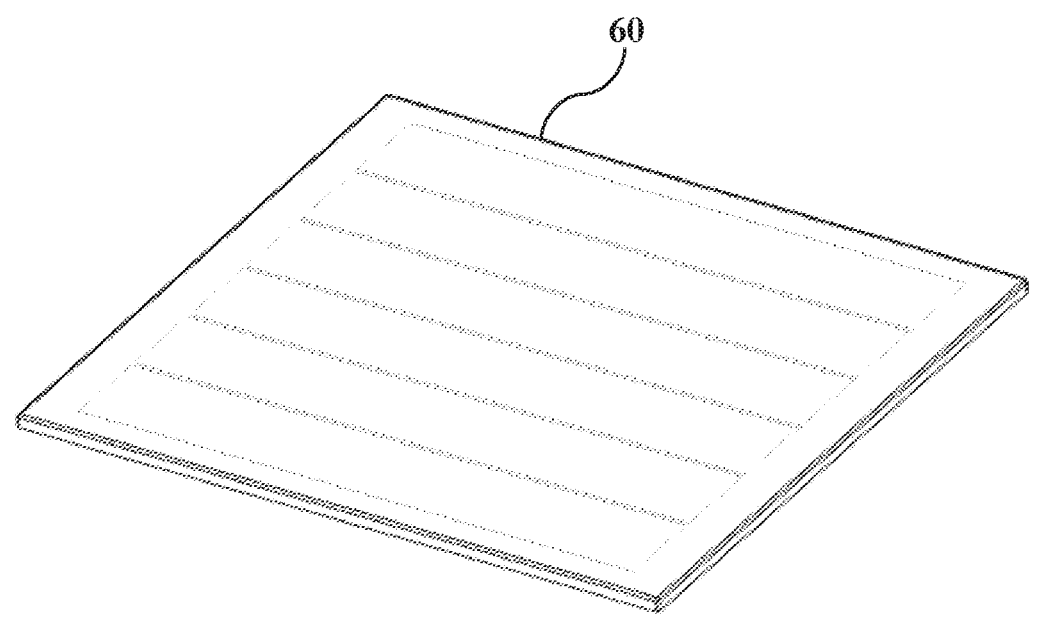
FIG. 5 is a perspective view of a solar panel of the outdoor speaker system.

Referring now to FIG. 5, as mentioned above, the outdoor speaker system 10 includes a plurality of solar panels 14 that provide power to the outdoor speaker system 10. The housing 12 is configured to mechanically and/or electrically connect to the plurality of solar panels 14. More specifically, the plurality of solar panels 14 includes a top solar panel 60 (see FIG. 5) and a continuous solar panel 62 (see FIG. 6). The top solar panel 60 is configured to couple to the top panel 16, positioned on the top side T of the housing 12, and the continuous solar panel 62 is configured to couple to at least two sides of the housing 12. The plurality of solar panels 14, in some configurations, couple to any of the side panels of the outdoor speaker system 10 such that the plurality of solar panels 14 extend across a substantial portion of each of the side panels. More details of the continuous solar panel 62 will be discussed further below. It is contemplated that the plurality of solar panels 14 may include of any type or composition of material. It is further contemplated that the plurality of solar panels 14 may be adapted to function independently of each other. For instance, the plurality of solar panels 14 receive solar energy to produce electrical energy regardless of whether each and every one of the solar panels 14 is receiving solar energy. In this way, the plurality of solar panels 14 may function independently. As a result, the solar panels 14 may be installed in the best position and at the best angle for receiving solar energy and may independently receive solar energy regardless of if the other solar panels 14 are receiving solar energy.

The outdoor speaker system 10 is solar charged/powered with the plurality of solar panels 14 that converts energy from the sun into electricity. More specifically, the plurality of solar panels 14 are configured to receive solar energy and covert the received solar energy into electrical energy. The plurality of solar panels 14 may be configured to electrically connect to a charging assembly 59. The charging assembly 59 includes a power storage device 61, e.g., a battery located within the housing 12, so that the electrical energy converted from the received solar energy is stored therein. The stored energy may then provide electricity to the outdoor speaker system 10 and related devices. It is contemplated that any wiring is included that connects the plurality of solar panels 14 to the speaker unit 24 or any other component of the outdoor speaker system 10 that may require electricity. Further, a control device and/or a converter may be included to provide the necessary conversion into electrical energy. The charging assembly 59 will be discussed in greater detail below.

The outdoor speaker system 10 is connectable to external devices. It is contemplated that the outdoor speaker system 10 is connectable to any number of external devices. It is further contemplated that the controller 34 is configured to adjust any energy delivery in real-time, e.g., based on received solar energy, changes in stored energy, number of external devices connected, and the like. This feature, coupled with the outdoor speaker system 10 connectivity and other control features, allows for both active energy management and adaptive energy management. For example, prioritizing charging of external devices. Other configurations are contemplated.

Additionally, the outdoor speaker system 10 provides the ability for users to use the backup power provided by a lithium or other type of battery when there is not enough solar power or energy available. This would allow for users to have continued use of the outdoor speaker system 10 either during the nighttime or in areas where sunlight is not available or is limited. The solar panels may divert at least some of the energy collected to the battery to use as a storage as well. The energy stored in the battery or batteries could be used instead of the solar panels or in conjunction with the panels, such as to provide additional electricity to one or more components. It will be appreciated that one or more batteries, such as a battery pack, may be included as part of the outdoor speaker system 10.

Figure 6:
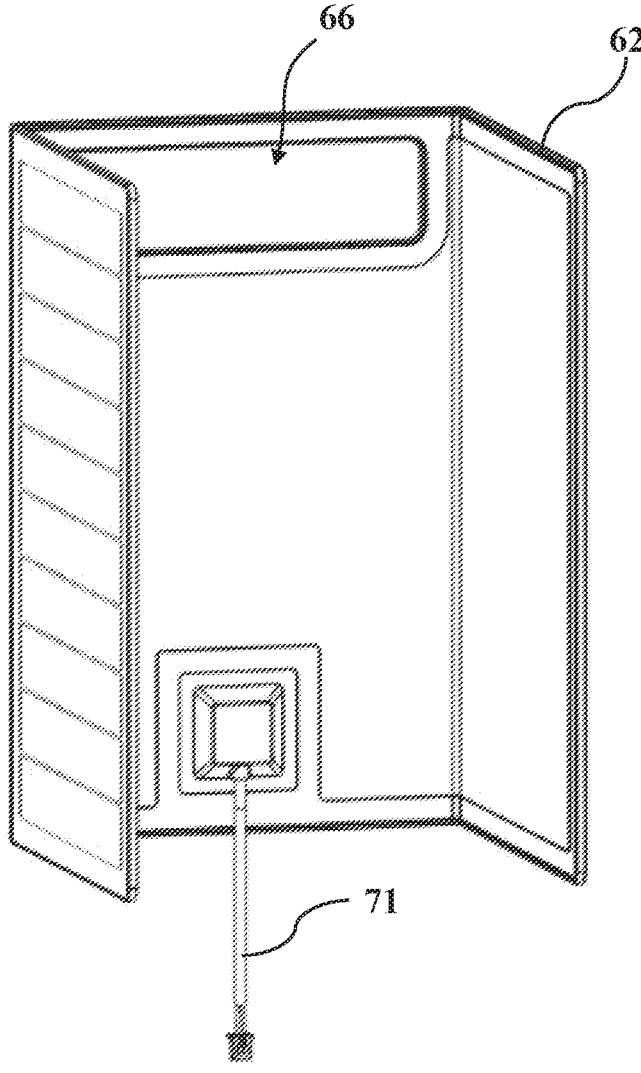
FIG. 6 is a perspective view of another solar panel, according to one configuration.
Figure 7:
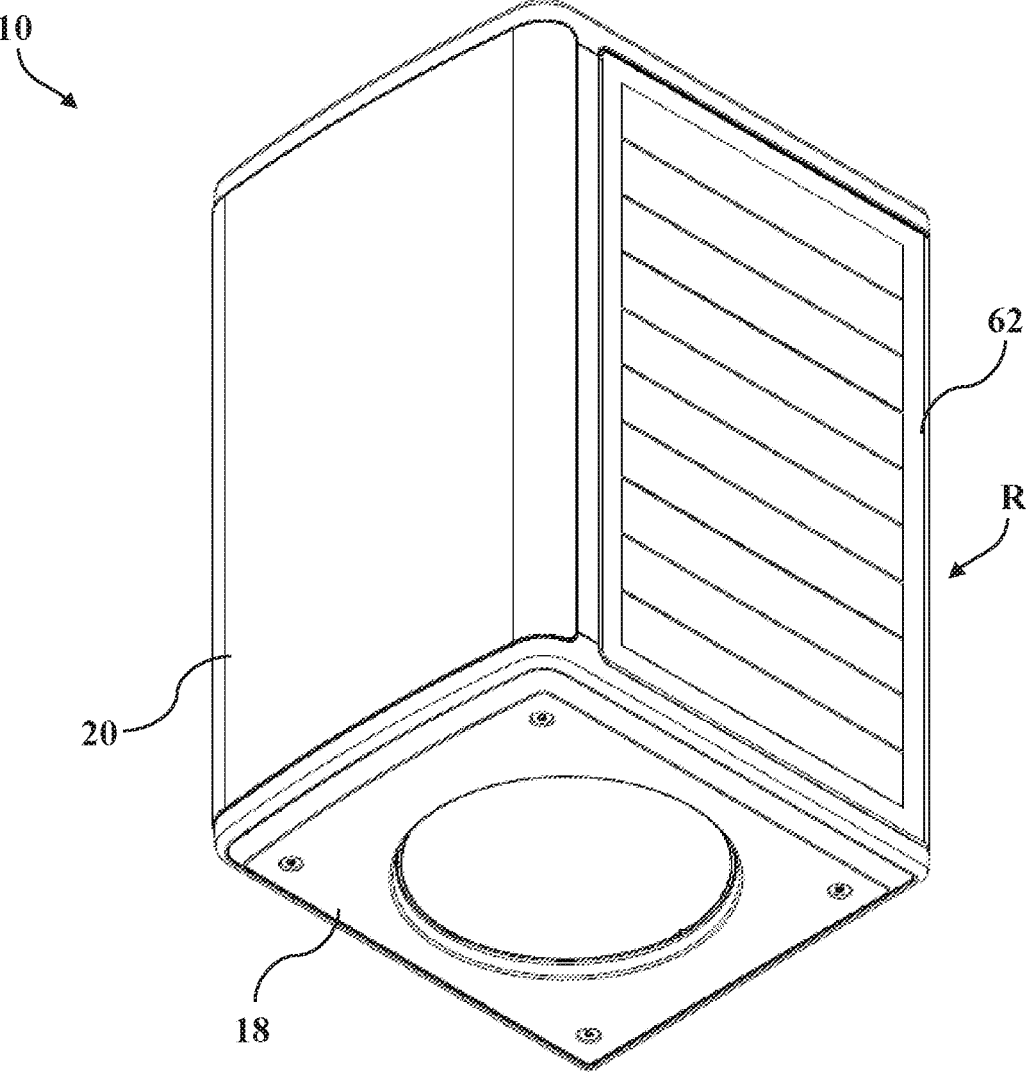
FIG. 7 is a right-side bottom perspective view of the outdoor speaker system.
Figure 8:
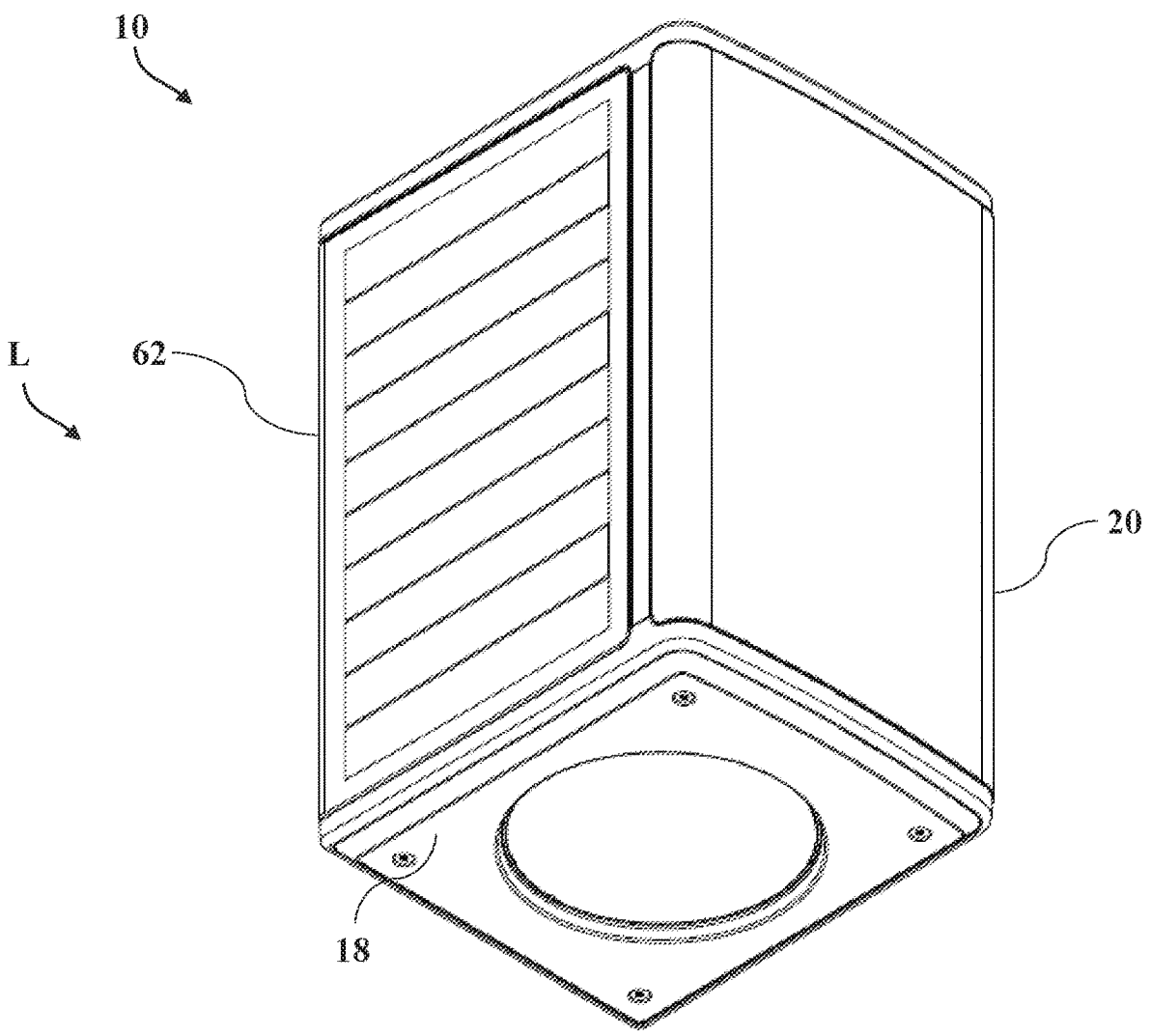
FIG. 8 is a left-side bottom perspective view of the outdoor speaker system.

Referring to FIGS. 6-8, the outdoor speaker system 10 including the continuous solar panel 62 is illustrated. The continuous solar panel 62 may include any number of solar panels. The continuous solar panel 62 is configured to couple to at least two sides of the outdoor speaker system 10. More specifically, in the configurations shown, the continuous solar panel 62 is a three-panel solar panel. As shown, the continuous solar panel 62 extends across three sides (the left side L, the right side R, and the back side BA) of the outdoor speaker system 10 and is configured to mount or cover the left panel, right panel, and the back panel. In some versions, the continuous solar panel 62 extends across a substantial portion of the sides of the outdoor speaker system 10 or the side panels 20, 22. It is contemplated that the continuous solar panel 62 may include one solar panel extending continuously across at least two sides of the outdoor speaker system 10. Alternatively, the continuous solar panel 62 may include multiple solar panels on a continuous panel extending continuously across the sides of the outdoor speaker system 10. It is further contemplated that the continuous solar panel 62 may entirely or partially cover the sides of the outdoor speaker system 10. The continuous solar panel 62 provides a continuous piece or component, such as a panel, extending continuously from a side to another side of the outdoor speaker system 10. Said differently, the solar panel (s) of the continuous solar panel 62 share a continuous backplane and/or panel forming a unitary component spanning multiple sides of the outdoor speaker system 10. In this way, the continuous solar panel 62 receives solar energy from the sun regardless of what direction the outdoor speaker system 10 is facing or positioned and the outdoor speaker system 10 will be provided with sufficient power in any type of environment.

The continuous solar panel 62 is configured to electrically and/or mechanically couple to any type and number of energy storage device(s). For example, the continuous solar panel 62 may be configured to be connected to a battery internal to the housing 12 of the outdoor speaker system 10. An exemplary connector 70 for the continuous solar panel 62 is illustrated in FIG. 6. In another example, the continuous solar panel 62 may be configured to be in electrical connection with a battery external to the housing 12 of the outdoor speaker system 10. It is contemplated that the continuous solar panel 62 may receive solar energy from the sun and transfer the received solar energy to any energy storage device to transfer electrical energy to any device. It is further contemplated that the connector 70 may be any type of connector suitable to connect to an energy storage device.

Figure 9:
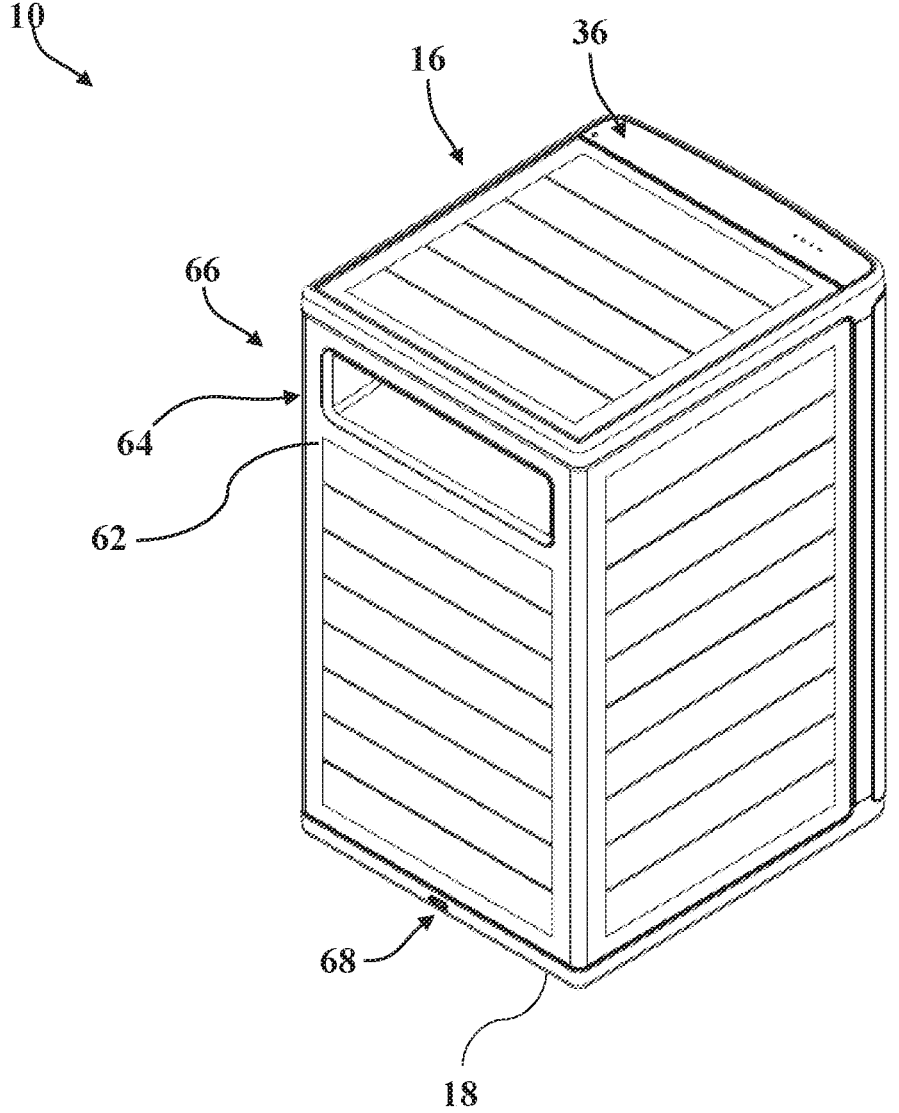
FIG. 9 is a left-side back perspective view of the outdoor speaker system including a handle portion.
Figure 10:
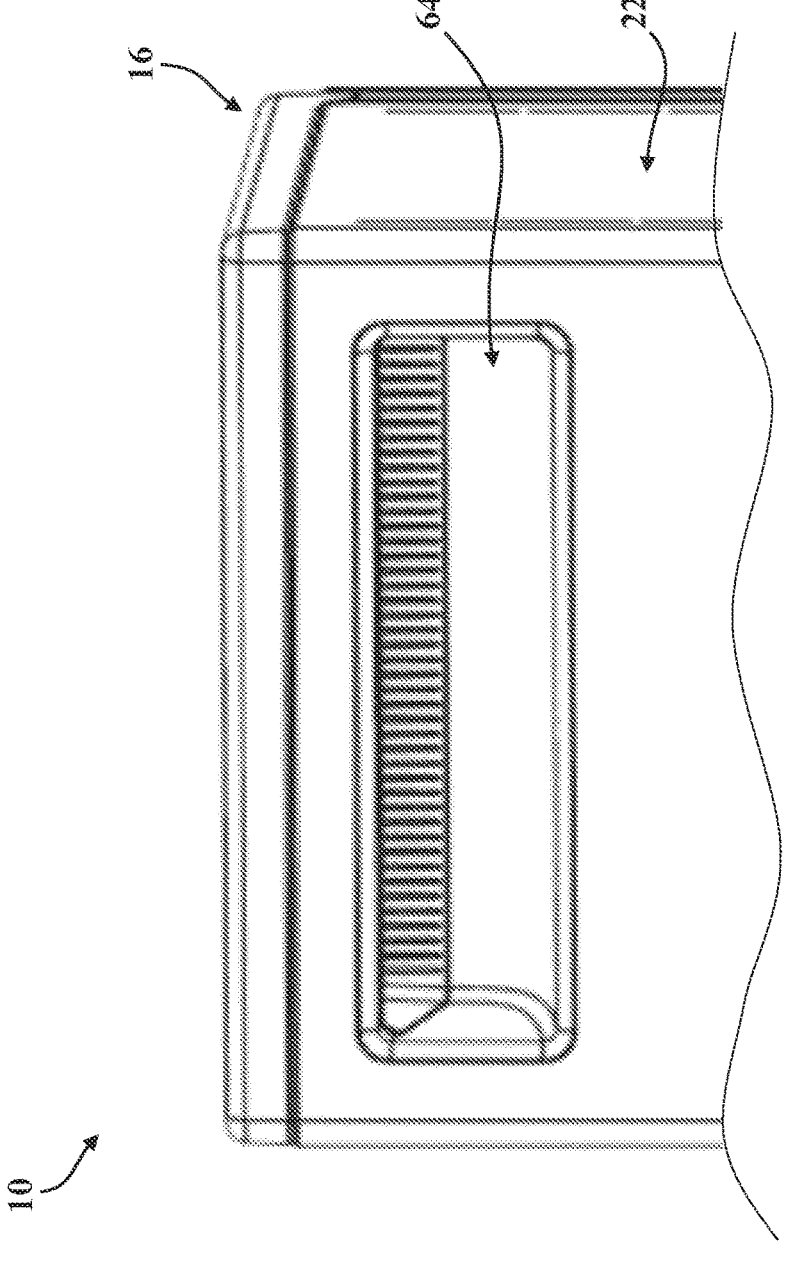
FIG. 10 is a partial perspective view of the handle portion of the outdoor speaker system.

Referring to FIGS. 9 and 10, the outdoor speaker system 10 includes a handle portion 64. As shown, the continuous solar panel 62 and the back panel may each define a handle opening 66 to accommodate the handle portion 64. The handle portion 64 may be formed integrally within the housing 12 such that a cavity or recess is provided for a grasping location and ease of carrying the outdoor speaker system 10. It is contemplated that the handle portion 64 may be formed on any sides of the housing 12. For example, the handle portion 64 may be formed on the top side T. In such configurations, the top panel 16 may define a handle opening 66 to accommodate the handle portion 64. It is further contemplated that the outdoor speaker system 10 may include any number of handle portions 64. For example, there may be two handle portions 64 with one formed on the right side R and one formed on the left side L wherein a right side panel and a left side panel each define a handle opening 66 to accommodate the handle portion 64. Further, the handle portion 64 may be shaped, sized, dimensioned, orientated, and such to provide a more amplified and/or better acoustic sound. For example, the handle portion 64 may include surfaces with certain curvature or dimension that creates acoustic resonance to amplify desired sound frequencies.

The outdoor speaker system may include any number of ports, holes, apertures configured to facilitate attachment and/or alignment, provide access to the control buttons, and/or enhance aesthetic appearance. As shown in FIG. 9, the outdoor speaker system includes a connector port configured to allow connection to any external device. It will be appreciated that the connector port may be any type of port including, but not limited to, a USB communication or charging port, a power port, audio port, Ethernet port, and the like. It will further be appreciated that the connector port may be any type of input and/or output port.

Figure 11:
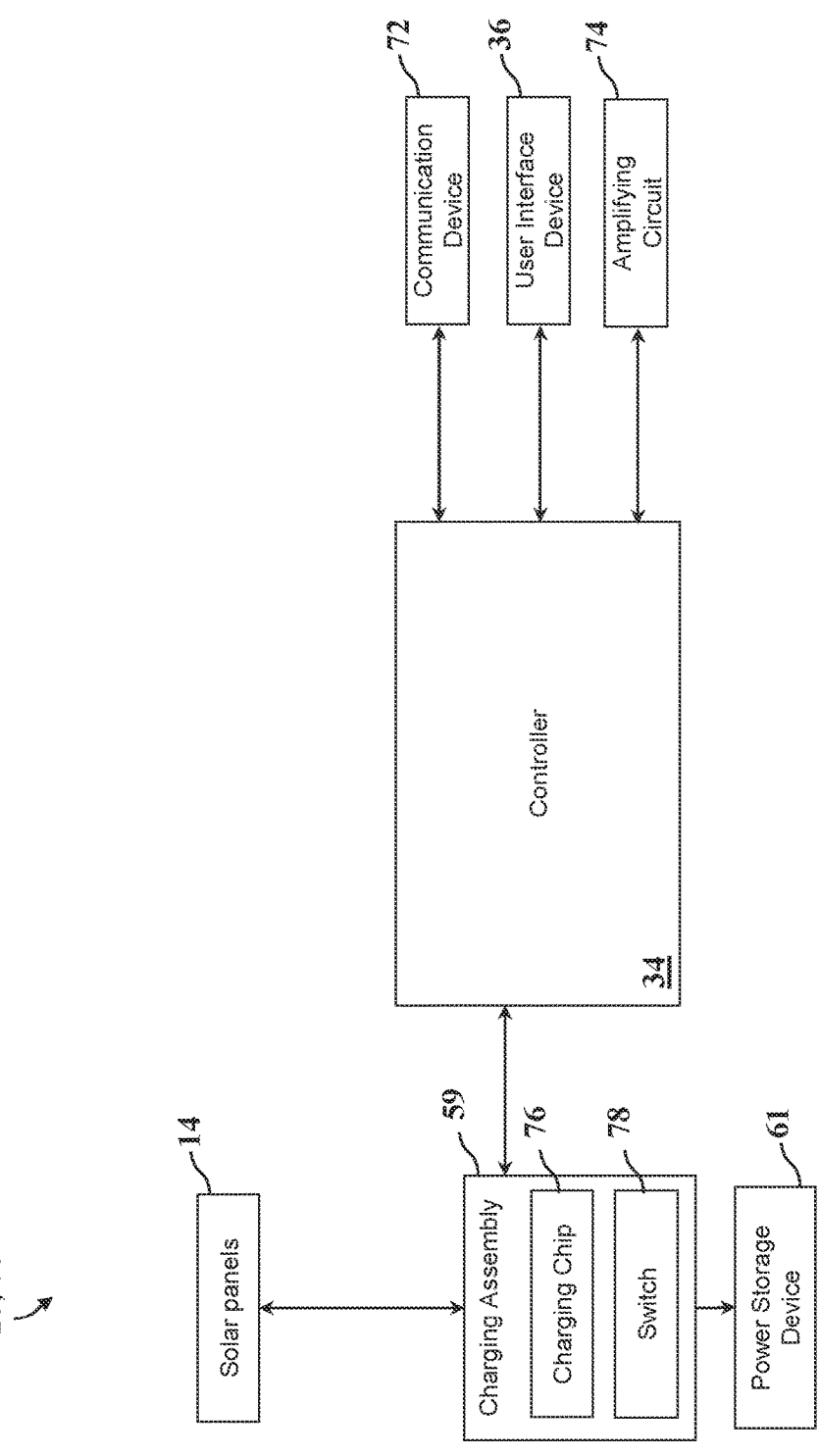
FIG. 11 is a partial schematic view of a control system of the outdoor speaker system of FIGS. 1-10.

Referring to FIG. 11, the outdoor speaker system 10 employs a control system, generally indicated at 70, as described herein. The control system 70 generally includes the controller 34 in electrical communication with at least one of the speaker unit 24, the plurality of solar panels 14, the charging assembly 59, and the user interface device 36. In certain configurations, the controller 34 is also electronically coupled to a communication device 72, amplifying circuit 74, and any external devices. The communication device 72 and the amplifying circuit 74 will be discussed in greater detail below. As noted above, the controller 34 is best depicted schematically in FIG. 11 and has been omitted from certain drawings for the purposes of clarity and consistency. It will be appreciated that the controller 34 and/or the control system 70 can be configured or otherwise arranged in a number of different ways. The controller 34 may have one or more microprocessors for processing instructions or for processing an algorithm stored in memory to control operation of the outdoor speaker system 10, including any component thereof. Additionally or alternatively, the controller 34 may include one or more microcontrollers, field programmable gate arrays, systems on a chip, discrete circuitry, and/or other suitable hardware, software, or firmware that is capable of carrying out the various functions and operations described herein.

In some configurations, the charging assembly 59 includes a charging chip 76 configured to charge the power storage device 61 and a switch 78 disposed between the plurality of solar panels 14 and the charging chip 76 to protect the power storage device 61. The charging chip 76 is electrically coupled to the plurality of solar panels 14 and the power storage device 61. The charging chip 76 is configured to receive solar energy from the plurality of solar panels 14 and charge the power storage device 61. In some configurations, the charging chip 76 converts or aids in the conversion of the solar energy to electrical energy and/or transmission of the electrical energy to be stored in the power storage device 61. It will be appreciated that there may be any number of charging chips 76. Other configurations of the charging chip 76 is contemplated.

The switch 78 is operable between an ON state for connecting at least one of the plurality of solar panels 14 to the charging chip 76 and an OFF state for disconnecting at least one of the plurality of solar panels 14 to the charging chip 76. The controller 34 is configured to control the switch 78 between the ON and OFF states based at least partially on the plurality of the solar panels 14 receiving solar energy. For instance, when it is detected that the solar panel 14 is not receiving enough solar energy or is at least partially covered, the charging chip 76 may not function properly which results in a fault. In this instance, the charging chip 76 is not properly functioning such that the solar energy is not being converted to electrical energy and/or the electrical energy is not being transmitted to or from or stored in the power storage device properly. To prevent a fault, the switch 78 is disposed between the plurality of solar panels 14 and the charging chip 76. It will be appreciated that any type of switch to connect and disconnect the plurality of solar panels 14 and the charging chip 76 is contemplated.

As noted above, in some configurations, the outdoor speaker system 10 includes a communication device 72 configured to communicate in any wireless manner, including any wireless protocol. This may include, but is not limited to, Bluetooth, Wi-Fi, cellular data, radio waves, satellite, or generally any other form of wireless connection and/or communication. For example, Bluetooth allows for a user to connect with the outdoor speaker system 10. In some configurations, the controller 34 includes the communication device 72. The controller 34 is configured to wirelessly communicate with the external device and is adapted to receive audio signals from the external device. Once received, the controller 34 transmits the audio signals received from the external device throughout the speaker unit 24. It is contemplated that there may be any number of external devices. For instance, the controller 34 may be configured to communicate with a first external device and a second external device simultaneously. In this case, the controller 34 is adapted to receive audio signals from at least one of the first and second external devices and transmit the audio signals through the speaker unit 24. Said differently, the controller 34 is adapted to prioritize the audio signals from the external devices and transmit the prioritized audio signal through the speaker unit 24. In this way, a user or multiple users can select the audio preferred and stream through the outdoor speaker system 10 at some distance away. An auxiliary cable similarly allows a user to stream music through the outdoor speaker system 10 while connected to some form of music source, with the addition of a cable that allows for the transfer of audio signals. While wireless connections are generally disclosed herein, any component of the outdoor speaker system 10 may be connected in a hardwired manner, such as through the use of ethernet or the like. It will be appreciated that the communication device 72 may be configured to communicate and/or electronically or mechanically couple to any external and/or internal device.

In some configurations, the outdoor speaker system 10 includes an amplifying circuit 74 electronically coupled to the controller 34. The amplifying circuit 74 has a dynamic voltage range with the ability to produce an output voltage swing above the input power supply voltage dynamically and as needed. In particular, the amplifying circuit 74 is configured to receive audio signals and vary the voltage range (or rail-to-rail range) based on the audio signal. The dynamic voltage range is at least partially based on the audio signal received. Said differently, the variations of the voltage range are controlled by the audio signal as the audio signal changes. In this way, the amplifying circuit 74 is adaptive. The amplifying circuit 74 is configured to receive the audio signal and generate an output signal within the dynamic voltage range. The amplifying circuit 74 and the controller 34 tracks the audio signal, determines the requisite voltage range (positive output voltage and/or negative output voltage), and generates the output signal. With the amplifying circuit having a dynamic voltage range, the outdoor speaker system 10 provides better audio while having efficient power usage.

It will be further appreciated that the terms "include," "includes," and "including" have the same meaning as the terms "comprise," "comprises," and "comprising."

Several configurations have been discussed in the foregoing description. However, the configurations discussed herein are not intended to be exhaustive or limit the invention to any particular form. The terminology which has been used is intended to be in the nature of words of description rather than of limitation.

Although several forms of the invention have been disclosed for illustrative purposes, it will be recognized that variations or modifications of the disclosed apparatus, including the rearrangement of parts, lie within the scope of the present invention.

What is claimed is:

1. An outdoor speaker system connectable to external devices, the outdoor speaker system comprising:
   a speaker unit;
   a housing having a top panel, a bottom panel opposing the top panel, and a plurality of side panels connecting the top panel and bottom panel to form an interior volume with the housing configured to accommodate the speaker unit within the interior volume;
   a plurality of solar panels for receiving solar energy to produce electrical energy with the plurality of solar panels coupled to each of the plurality of side panels; and
   a charging assembly operably coupled to the plurality of solar panels with the charging assembly including a power storage device being adapted to receive and store the electrical energy from the plurality of solar panels,
   wherein the plurality of solar panels is disposed on at least four sides of the housing such that the plurality of solar panels receives solar energy from any direction for energizing the outdoor speaker system,
   wherein the charging assembly further includes a switch in communication with a controller and disposed between the plurality of solar panels and the charging chip, the switch being operable between:
      an ON state for connecting at least one of the plurality of solar panels to the charging chip, and
      an OFF state for disconnecting at least one of the plurality of solar panels from the charging chip, and
   wherein the controller is configured to control the switch between the ON state and OFF state based at least partially on the plurality of solar panels receiving solar energy.

2. The outdoor speaker system of claim 1, wherein the outdoor speaker system further comprises a user interface device operable to provide control of the speaker unit.

3. The outdoor speaker system of claim 2, wherein the outdoor speaker system further comprises a controller disposed within the housing and in electrical communication with at least one of the speaker unit, the plurality of solar panels, the charging assembly, and the user interface device.

4. The outdoor speaker system of claim 3, wherein the controller is configured to wirelessly communicate with the external devices and is adapted to receive audio signals from the external devices and transmit the audio signals through the speaker unit.

5. The outdoor speaker system of claim 4, wherein the controller is configured to wirelessly communicate using a Bluetooth protocol.

6. The outdoor speaker system of claim 4, wherein the power storage device is configured to charge the external devices.

7. The outdoor speaker system of claim 1, wherein the outdoor speaker system further comprises a plurality of magnets coupled to the bottom panel for mounting the outdoor speaker system.

8. The outdoor speaker system of claim 1, wherein the plurality of solar panels is further defined as a continuous solar panel such that the continuous solar panel is configured to couple to at least two sides of the housing.

9. The outdoor speaker system of claim 1, wherein outdoor speaker system further comprises a handle portion integrally formed with at least one of the top panel, bottom panel, and plurality of side panels.

10. The outdoor speaker system of claim 9, wherein one of the plurality of side panels is further defined as a back panel and the handle portion is integrally formed with the back panel such that the back panel defines a handle opening.

11. The outdoor speaker system of claim 1, wherein the plurality of side panels includes a front panel and a speaker panel coupled to the front panel with the speaker unit being positioned adjacent the speaker panel.

12. The outdoor speaker system of claim 11, wherein the speaker panel defines at least one opening adapted to receive the speaker unit.

13. The outdoor speaker system of claim 1, wherein the plurality of solar panels couple to each of the plurality of side panels such that the plurality of solar panels extend across a substantial portion of each of the plurality of side panels.

14. The outdoor speaker system of claim 1, wherein the outdoor speaker system further comprises a controller configured to simultaneously communicate with the external devices via a Bluetooth protocol.

15. The outdoor speaker system of claim 14, wherein controller is adapted to receive audio signals from the external devices, prioritize the audio signals from one of the external devices, and transmit the prioritized audio signal through the speaker unit.

16. The outdoor speaker system of claim 1, wherein the outdoor speaker system further comprises a controller electronically coupled to the charging assembly, and wherein the charging assembly further includes a charging chip electronically coupled to the plurality of solar panels, the power storage device, and a controller, the charging chip being configured to charge the power storage device.

17. The outdoor speaker system of claim 1, wherein the outdoor speaker system further comprises an amplifying circuit electronically coupled to the controller with the amplifying circuit having a dynamic voltage range.

18. The outdoor speaker system of claim 17, wherein the amplifying circuit is configured to receive an audio signal and generate an output signal within the dynamic voltage range, wherein the dynamic voltage range is at least partially based on the audio signal received.

\* \* \* \* \*